United States Patent
Shi et al.

(10) Patent No.: US 12,515,539 B2
(45) Date of Patent: Jan. 6, 2026

(54) MOTOR CONTROL UNIT, POWER TRAIN, CONTROL METHOD, AND ELECTRIC VEHICLE

(71) Applicant: Huawei Digital Power Technologies Co., Ltd., Shenzhen (CN)

(72) Inventors: Chaojie Shi, Dongguan (CN); Chaoqiang Wu, Shenzhen (CN); Shankai Chen, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/361,652

(22) Filed: Jul. 28, 2023

(65) Prior Publication Data

US 2024/0001776 A1 Jan. 4, 2024

Related U.S. Application Data

(63) Continuation of application No. PCT/CN2021/074492, filed on Jan. 29, 2021.

(51) Int. Cl.
*B60L 50/51* (2019.01)
*B60L 15/00* (2006.01)
*H02P 21/22* (2016.01)
*H02P 27/06* (2006.01)

(52) U.S. Cl.
CPC .......... *B60L 50/51* (2019.02); *B60L 15/007* (2013.01); *H02P 21/22* (2016.02); *H02P 27/06* (2013.01); *B60L 2210/42* (2013.01)

(58) Field of Classification Search
CPC .......... H02P 27/08; H02P 27/06; H02P 21/22; B60L 2240/545; B60L 58/27; B60L 50/51; B60L 15/007; B60L 58/24
See application file for complete search history.

(56) References Cited

U.S. PATENT DOCUMENTS

| | | | | |
|---|---|---|---|---|
| 7,791,295 B2* | 9/2010 | Oi | ............... | H02P 21/06 318/432 |
| 8,536,809 B2* | 9/2013 | Kojima | ............... | B60L 58/27 320/144 |
| 9,762,152 B2* | 9/2017 | Yamada | ............... | B60L 15/02 |
| 11,290,045 B2* | 3/2022 | Shen | ............... | H02P 27/12 |
| 12,237,795 B2* | 2/2025 | Penne | ............... | B60L 3/0061 |

(Continued)

FOREIGN PATENT DOCUMENTS

| | | | |
|---|---|---|---|
| CN | 101710631 A | | 5/2010 |
| CN | 102761300 A | | 10/2012 |

(Continued)

*Primary Examiner* — Thai T Dinh
(74) *Attorney, Agent, or Firm* — Maier & Maier, PLLC

(57) ABSTRACT

This application discloses a motor control unit, a power train, a control method, and an electric vehicle, and relates to the field of electric vehicle technologies. An input end of the motor control unit connects to a power battery pack, an output end of the motor control unit connects to three phases of motor windings of a motor, and the motor control unit includes an inverter circuit and a controller. The controller is configured to control the inverter circuit to simultaneously output currents to the three phases of motor windings, and control the currents input to all the phases of motor windings to sequentially reach a preset current.

18 Claims, 5 Drawing Sheets

(56) References Cited

U.S. PATENT DOCUMENTS

| | | | | |
|---|---|---|---|---|
| 2012/0200241 A1* | 8/2012 | Kojima | ................... | B60L 58/25 |
| | | | | 318/139 |
| 2018/0083509 A1 | 3/2018 | Yang et al. | | |
| 2021/0351732 A1* | 11/2021 | Shen | ................... | H01M 10/637 |
| 2022/0080858 A1* | 3/2022 | Lian | ........................ | B60L 58/34 |
| 2022/0223937 A1* | 7/2022 | Xu | ......................... | B60L 50/60 |
| 2023/0062270 A1* | 3/2023 | Li | ....................... | H01M 50/249 |

FOREIGN PATENT DOCUMENTS

| | | |
|---|---|---|
| CN | 103560304 A | 2/2014 |
| CN | 103743059 A | 4/2014 |
| CN | 104538701 A | 4/2015 |
| CN | 105353796 A | 2/2016 |
| CN | 205445835 U | 8/2016 |
| CN | 106160615 A | 11/2016 |
| CN | 206180917 U | 5/2017 |
| CN | 111347853 A | 6/2020 |
| CN | 111347936 A | 6/2020 |
| CN | 111354999 A | 6/2020 |
| CN | 111572408 A | 8/2020 |
| JP | 2012165526 A | 8/2012 |
| JP | 5849917 B2 | 2/2016 |

* cited by examiner

MOTOR CONTROL UNIT, POWER TRAIN, CONTROL METHOD, AND ELECTRIC VEHICLE

CROSS-REFERENCE TO RELATED APPLICATIONS

This application is a continuation of International Application No. PCT/CN2021/074492, filed on Jan. 29, 2021, the disclosure of which is hereby incorporated by reference in its entirety.

TECHNICAL FIELD

This application relates to the field of electric vehicle technologies, and in particular, to a motor control unit, a power train, a control method, and an electric vehicle.

BACKGROUND

With aggravation of an energy shortage and environmental pollution in the modern society, as new energy vehicles, and electric vehicles have received widespread attention. The electric vehicle is powered by a power battery pack, and converts electric energy into mechanical energy by using a motor, to drive the motor.

As a large quantity of electric vehicles are deployed, many electric vehicles are used in an area in which it is cold in winter or an area in which it is cold at anytime. However, the power battery pack of the electric vehicle has relatively poor discharge performance at a low temperature, and therefore the power battery needs an efficient low-temperature heating measure, to ensure that the power battery pack can output power to the motor within a safe temperature range.

FIG. 1 is a schematic diagram of a heating apparatus for a power battery pack in the conventional technology.

The heating apparatus includes a positive temperature coefficient (PTC) resistor Rp and a controllable switching transistor S. The PTC resistor Rp and S are connected in series, and then are connected in parallel with a bus capacitor Co of an electric vehicle. When a battery management system (BMS) of the electric vehicle determines that there is a relatively low battery temperature, the controllable switching transistor S is controlled to be closed, and the PTC resistor Rp connects to a circuit, and then releases heat, to heat the power battery pack. However, in this heating manner, an additional heating apparatus needs to be added, and consequently space is occupied, and costs are increased.

Another method for heating a power battery pack in the conventional technology is as follows: Waste heat generated by a motor winding is absorbed by using a heat-conducting medium, and is used for heating the power battery pack. However, there are two problems in this solution: First, heat generated only by the motor winding is used, and there is a relatively small heating power, resulting in a relatively low heating speed. Second, in this manner, three phases of windings of a motor are used as a current loop, and a current is injected into the motor winding in the following manner: A current is input to one phase of winding, and the other two phases of windings output a current; or a current is input to one phase of winding, one phase of winding outputs a current, and a current of a third phase of winding is 0. However, regardless of a manner that is used, currents of the three phases of windings cannot be equal, and therefore the three phases of windings generate heat unevenly. Due to uneven heat generation, a phase of winding that generates relatively high heat ages relatively fast, a problem such as an imbalance among three phases is likely to occur, and consequently performance of the motor is affected. In addition, due to uneven heat generation, a winding temperature rise is limited by a phase of winding at a highest temperature. In this through-current heating manner, a heat generation capability of the three phases of windings cannot be fully used.

SUMMARY

This application provides a motor control unit, a power train, a control method, and an electric vehicle, to avoid a case in which an additional heating apparatus is added to heat a power battery pack, reduce occupied space and costs, and improve a heating effect of the power battery pack.

According to a first aspect, this application provides a motor control unit (MCU). An input end of the motor control unit connects to a power battery pack, and an output end of the motor control unit connects to three phases of motor windings of a motor. The motor control unit includes an inverter circuit and a controller. An input end of the inverter circuit is the input end of the motor control unit, and each phase of output end of the inverter circuit connects to one phase of motor winding of the motor. The controller is configured to: control the inverter circuit to simultaneously output currents to the three phases of motor windings, and control the currents input to all the phases of motor windings to sequentially reach a preset current.

The controller controls the inverter circuit to simultaneously output currents to the three phases of motor windings. In this case, all of the three phases of motor windings generate heat, and therefore overall heating power of the motor is increased. In addition, the controller controls an output current of the inverter circuit, so that the currents of all the phases of motor windings sequentially reach the preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. In addition, in the solution provided in this application, a case in which an additional heating apparatus is added to heat the power battery pack is avoided, and occupied space and costs are reduced.

The controller may be an application-specific integrated circuit (ASIC), a programmable logic device (PLD), a digital signal processor (DSP), or a combination thereof. The PLD may be a complex programmable logic device (CPLD), a field-programmable gate array (FPGA), generic array logic (GAL), or any combination thereof. This is not limited in this application.

The inverter circuit includes a controllable switching transistor. A type of the controllable switching transistor is not limited in this application. For example, the controllable switching transistor may be an insulated gate bipolar transistor (IGBT), a metal oxide semiconductor field effect transistor (MOSFET), or a silicon carbide field effect transistor (SiC MOSFET).

The controller sends a control signal to the controllable switching transistor, to control a working status of the controllable switching transistor. The control signal may be a pulse width modulation (PWM) signal.

In a possible implementation, the controller further determines the preset current based on a temperature of the power battery pack, and a magnitude of the preset current is negatively correlated with the temperature of the power battery pack.

For the power battery pack, within a same heating time, a lower temperature of the power battery pack indicates that a higher speed of heating the power battery pack is required, and a larger magnitude of the corresponding preset current is required.

The controller may obtain temperature information of the power battery pack by using a vehicle control unit (VCU) or a BMS, to determine the temperature of the power battery pack.

In a possible implementation, the controller further determines the preset current based on an obtained heating instruction, and the heating instruction is used to indicate a magnitude of the preset current. A driver may determine a heating power level (a higher heating power level indicates a higher heating speed) for the power battery pack based on an actual requirement, or adjust a heating time (a shorter heating time is equivalent to a higher heating power level) of the power battery pack. In response to an input operation performed by the diver, a vehicle control unit (VCU) determines the corresponding heating instruction with reference to current temperature information of the power battery pack, and sends the heating instruction to the controller. The heating instruction is used to indicate the magnitude of the preset current.

In a possible implementation, the controller is configured to: determine an amplitude and a phase of the input current of each phase of motor winding based on a preset position angle and the preset current, where the preset position angle represents an angle between the preset current and a d axis of the motor; determine an amplitude and a phase of an input voltage of each phase of motor winding based on the amplitude and the phase of the input current of each phase of motor winding and impedance of each phase of motor winding; and determine a duty cycle of a control signal of the inverter circuit based on the amplitude of the input voltage, and determine a sending time of the control signal of the inverter circuit based on the phase of the input voltage, to control the motor control unit by using the corresponding control signal.

In a possible implementation, the controller is configured to control the preset position angle to periodically change within a preset angle range, so that the currents input to all the phases of motor windings to sequentially reach the preset current.

In a possible implementation, the preset angle range is from 0° to 360°, the controller controls the preset position angle to periodically change based on a preset time interval and a preset angle increment, and a value of the preset angle increment is a positive divisor of 120.

The positive divisor of 120 includes 1, 2, 3, 4, 5, 6, 8, 10, 12, 15, 20, 24, 30, 40, 60, and 120.

In a possible implementation, the preset angle range is from 0° to 120°, the controller controls the preset position angle to periodically change based on a preset time interval and a preset angle increment, and a value of the preset angle increment is a positive divisor of 60.

The positive divisor of 60 includes 1, 2, 3, 4, 5, 6, 10, 12, 15, 20, 30, and 60.

In a possible implementation, the controller is configured to control the current output by the inverter circuit to each of the three phases of motor windings to be in one of the following waveforms: a sine wave, a square wave, or a triangular wave.

In a possible implementation, the inverter circuit is a three-phase two-level inverter circuit or a three-phase three-level inverter circuit.

In a possible implementation, the controller is further configured to control a working status of a pump apparatus, and the motor performs heat exchange by using a first cooling loop, and drives, by using the pump apparatus, a cooling medium to circulate in the first cooling loop.

According to a second aspect, this application provides a power train. The power train includes the motor control unit provided in the foregoing implementations, and further includes a motor, a first cooling loop, a second cooling loop, a pump apparatus, and a heat exchanger. The first cooling loop is configured to perform heat exchange for the motor. The second cooling loop is configured to perform heat exchange between the motor control unit and a power battery pack. The pump apparatus is configured to drive a cooling medium to circulate in the first cooling loop. The heat exchanger is configured to implement heat exchange between the cooling medium in the first cooling loop and a cooling medium in the second cooling loop.

The first cooling loop and the second cooling loop of the power train fully absorb heat generated by the motor control unit and a motor winding, to heat the power battery pack, and therefore a speed of heating the power battery pack is increased.

According to a third aspect, this application further provides a control method for a motor control unit. The method is used to control the motor control unit provided in the foregoing implementations. The method includes the following steps:

determining a preset current used by all phases of motor windings to heat a power battery pack; and controlling an inverter circuit to simultaneously output currents to the three phases of motor windings, and controlling the currents input to all the phases of motor windings to sequentially reach the preset current.

According to the control method, all of the three phases of motor windings can be controlled to generate heat, and therefore overall heating power of a motor is increased. In addition, an output current of the inverter circuit is controlled, so that the currents of all the phases of motor windings sequentially reach the preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. In addition, no additional heating apparatus is needed, and occupied space and costs can be reduced.

In a possible implementation, the determining a preset current used by all phases of motor windings to heat a power battery pack includes:

determining the preset current based on a temperature of the power battery pack. A magnitude of the preset current is negatively correlated with the temperature of the power battery pack.

Temperature information of the power battery pack may be obtained by using a VCU or a BMS, to determine the temperature of the power battery pack.

In a possible implementation, the determining a preset current used by all phases of motor windings to heat a power battery pack includes:

determining the preset current based on an obtained heating instruction. The heating instruction is used to indicate a magnitude of the preset current.

In response to an input operation performed by a driver, a VCU determines the corresponding heating instruction with reference to current temperature information of the power battery pack, and sends the heating instruction to a controller. The heating instruction is used to indicate the magnitude of the preset current.

In a possible implementation, the controlling the inverter circuit to simultaneously output currents to the three phases of motor windings, and controlling the currents input to all the phases of motor windings to sequentially reach the preset current includes:

determining an amplitude and a phase of the input current of each phase of motor winding based on a preset position angle and the preset current, where the preset position angle represents an angle between the preset current and a d axis of the motor;

determining an amplitude and a phase of an input voltage of each phase of motor winding based on the amplitude and the phase of the input current of each phase of motor winding and impedance of each phase of motor winding; and determining a duty cycle of a control signal of the inverter circuit based on the amplitude of the input voltage, and determining a sending time of the control signal of the inverter circuit based on the phase of the input voltage.

In a possible implementation, the controlling the currents input to all the phases of motor windings to sequentially reach the preset current includes: controlling the preset position angle to periodically change within a preset angle range.

In a possible implementation, the preset angle range is from 0° to 360°, and the controlling the preset position angle to periodically change within a preset angle range includes:

controlling the preset position angle to periodically change based on a preset time interval and a preset angle increment, where a value of the preset angle increment is a divisor of 120. The positive divisor of 120 includes 1, 2, 3, 4, 5, 6, 8, 10, 12, 15, 20, 24, 30, 40, 60, and 120.

In a possible implementation, the preset angle range is from 0° to 120°, and the controlling the preset position angle to periodically change within a preset angle range includes:

controlling the preset position angle to periodically change based on a preset time interval and a preset angle increment, where a value of the preset angle increment is a divisor of 60. The positive divisor of 60 includes 1, 2, 3, 4, 5, 6, 10, 12, 15, 20, 30, and 60.

According to a fourth aspect, this application further provides an electric vehicle. The electric vehicle includes the power train provided in the foregoing implementations, and further includes a power battery pack. An output end of the power battery pack connects to an input end of a motor control unit, and the power battery pack is configured to provide a direct current for the power train.

The motor control unit provided in the foregoing embodiments is applied to the electric vehicle, and therefore overall heating power of a motor is increased. In addition, three phases of motor windings are controlled to generate heat evenly. In this way, a speed of heating the power battery pack is increased, and a case in which a service life of a phase of motor winding is significantly shortened because the motor winding generates heat for a long time is avoided, and therefore symmetry and reliability of the motor are improved. In addition, a case in which an additional heating apparatus is added to heat the power battery pack is avoided, and therefore costs of the electric vehicle are reduced.

DETAILED DESCRIPTION OF ILLUSTRATIVE EMBODIMENTS

To make a person skilled in the art better understand the technical solutions provided in the embodiments of this application, an application scenario of the technical solutions provided in this application is first described below.

Figure 1:
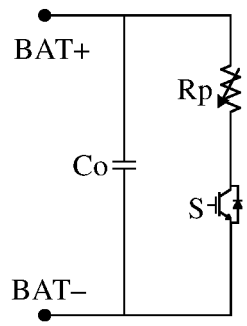
FIG. 1 is a schematic diagram of a heating apparatus for a power battery pack in the conventional technology.

FIG. 1 is a schematic diagram of an electrical system of an example electric vehicle according to an embodiment of this application.

The electrical system of the electric vehicle shown in the figure mainly includes a motor control unit 10, a motor 20, a power battery pack 30, a high-voltage power distribution unit 40, a DC-DC circuit 50, a low-voltage battery 60, a direct current charging circuit 70, and an alternating current charging circuit 80.

The power battery pack 30 is configured to provide a high-voltage direct current. One part of the high-voltage direct current is converted into an alternating current by using the high-voltage power distribution unit 40 and the motor control unit 10, and the alternating current is provided for the motor 20, to drive the electric vehicle. The other part of the high-voltage direct current is converted into a low-voltage direct current by using the high-voltage power distribution unit 40 and the DC-DC circuit 50, and the low-voltage direct current is provided for the low-voltage battery 60 and a low-voltage system of the electric vehicle.

When the electric vehicle is charged, in some embodiments, the electric vehicle charges a power battery pack 30 by using the direct current charging circuit 70. In this case, the direct current charging circuit 70 connects to a direct current charging pile. This charging manner is also referred to as "direct current fast charging".

In some other embodiments, the electric vehicle is charged by using the alternating current charging circuit 80. In this case, the alternating current charging circuit 80 connects to an alternating current charging pile. In this case, the alternating current charging circuit 80 may be an on-board charger (OBC). The OBC may further charge the low-voltage battery 60.

A working principle of the motor 20 is described below.

Figure 3:
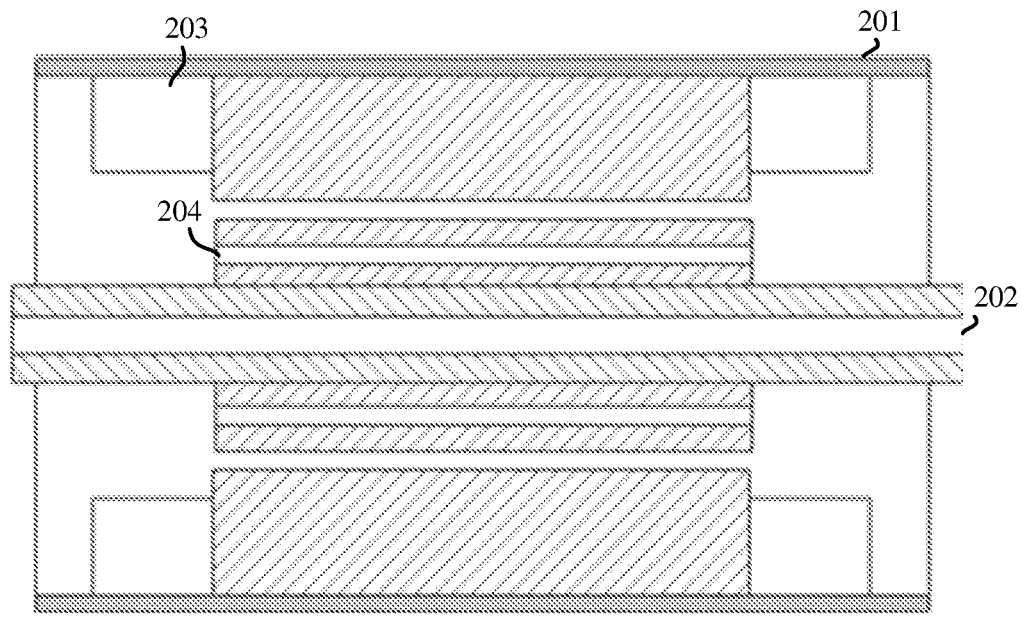
FIG. 3 is a schematic diagram of a structure of an example motor according to an embodiment of this application.

FIG. 3 is a schematic diagram of a structure of an example motor according to an embodiment of this application.

The motor 20 includes a housing 201, a rotating shaft 202, a stator 203, and a rotor 204.

The motor 20 is an oil-cooled motor, and an iron core of each of the housing 201, the rotating shaft 202, and the rotor 204 of the motor 20 is provided with a cooling loop. A cooling medium remains in the cooling loop, and can circulate in the cooling loop. The cooling medium is configured to cool the motor 20, and is further configured to lubricate a motor component, for example, a bearing, in the motor 20. The cooling medium may flow into and flow out of a cavity of the motor from the housing of the motor, or may flow into and flow out of the cavity of the motor from both ends of the motor.

The stator 203 of the motor is a stationary part in the motor, and mainly includes an iron core and a stator winding.

The rotor 204 of the motor is a rotating component in the motor, and is configured to convert electric energy into mechanical energy.

A power loss of the motor 20 usually includes parts such as a copper loss, an iron loss, and a permanent magnet loss.

The copper loss refers to heat generated when a current flows through a copper conductor, and heating power P1 of the copper loss is equal to $I_1^2 \cdot R_1$, where $I_1$ is the current flowing through the copper conductor, and $R_1$ is resistance of the copper conductor.

The iron loss is a loss generated by a ferromagnetic material, for example, steel or a silicon steel sheet, of the motor 20 in an alternating magnetic field, and includes a hysteresis loss, an eddy current loss, a stray loss, and the like.

The permanent magnet loss is a corresponding eddy current loss that is generated due to the fact that a permanent magnet material of the motor 20 has electric conductivity, and therefore an eddy current is generated through induction in the alternating magnetic field. Heating power P2 of the permanent magnet loss is equal to $I_2^2 \cdot R_2$, where $I_2$ is a current generated in the permanent magnet material through induction, and $R_2$ is resistance of an eddy current loop.

Currently, an analysis method commonly used for a three-phase current of the motor 20 is Park's transformation in which a stationary three-phase coordinate is transformed into a rotating dq-axis coordinate, to simplify analysis. A d axis (direct axis) is also referred to as a direct axis, and the d axis is parallel to the rotating shaft (a field axis) of the motor. A q axis (quadrature axis) is also referred to as a quadrature axis, and is perpendicular to the field axis of the motor, in other words, perpendicular to the d axis.

Currently, a power battery pack may be heated by using a solution of disposing an additional heating apparatus. However, for the heating apparatus, extra space is occupied, and hardware costs are increased. In addition, the heating apparatus further has problems such as uneven heating and low heating efficiency, and cannot effectively increase a temperature of the power battery pack, and consequently electrochemical performance of the power battery pack cannot be effectively improved.

To resolve the foregoing problems, this application provides a motor control unit, a power train, a control method, and an electric vehicle. An alternating current is injected into a stator winding of a motor by using the motor control unit, and a position of a d axis of the alternating current is determined based on a preset position angle. The preset position angle periodically and regularly changes relative to the actual d axis, so that three phases of windings of the motor evenly generate heat, and generate sufficient heat, to heat a power battery pack.

To make a person skilled in the art better understand the solutions of this application, the technical solutions in the embodiments of this application are described below with reference to the accompany drawings in the embodiments of this application.

The terms "first" and "second" in the following description of this application are merely used for a purpose of description, and shall not be understood as an indication or an implication of relative importance or an implicit indication of a quantity of indicated technical features.

In this application, unless otherwise clearly specified and limited, the term "connection" should be understood in a broad sense. For example, a "connection" may be a fixed connection, may be a detachable connection, may be an integral connection, may be a direct connection, or may be an indirect connection through an intermediate medium.

An embodiment of this application provides a motor control unit. Specific description is provided below with reference to the accompany drawings.

Figure 4:
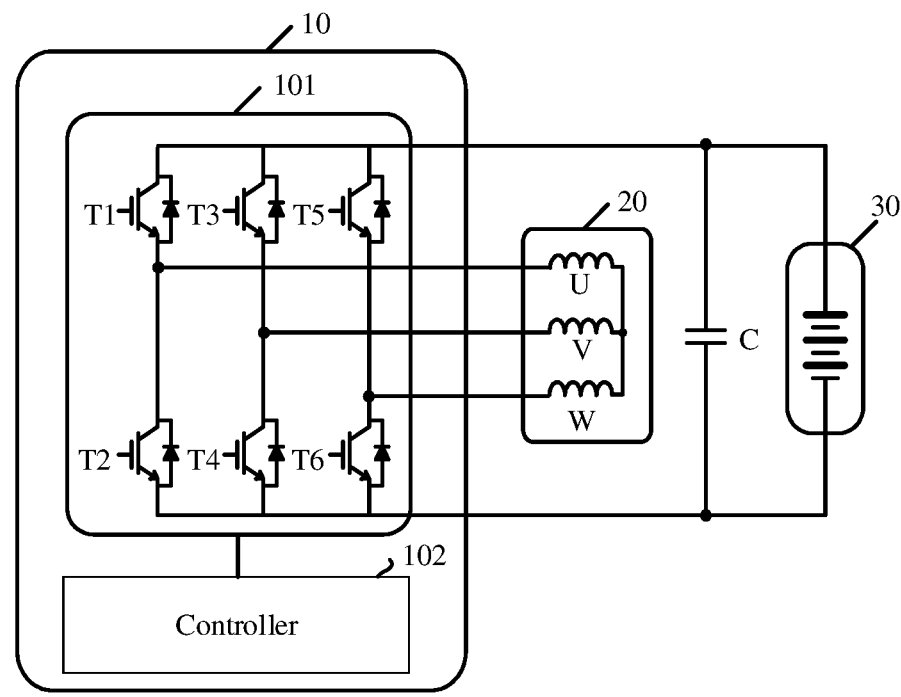
FIG. 4 is a schematic diagram of a motor control unit according to an embodiment of this application.

FIG. 4 is a schematic diagram of a motor control unit according to an embodiment of this application.

An input end of the motor control unit 10 connects to a power battery pack 30, and an output end of the motor control unit connects to a winding of a motor 20.

The motor 20 includes three phases of windings that are respectively represented by U, V, and W.

The motor control unit 10 includes three phases of output ends, and each phase of output end connects to one phase of motor winding of the motor.

The motor control unit 10 includes an inverter circuit 101 and a controller 102.

The inverter circuit 101 may also be referred to as a direct current (DC)-alternating current (AC) conversion circuit, or may be referred to as an inverter.

The inverter circuit 101 may be a three-phase two-level inverter circuit or a three-phase three-level inverter circuit. This is not limited in this embodiment of this application. In the following description, an example in which the inverter circuit 101 may be a three-phase two-level inverter circuit is used.

An input end of the inverter circuit 101 is the input end of the motor control unit 10, and each phase of output end of the inverter circuit 101 connects to one phase of motor winding of the motor 20.

The inverter circuit 101 is configured to: convert a direct current provided by the power battery pack 30 into an alternating current, and output the alternating current to the motor winding.

The controller 102 is configured to: control the inverter circuit 101 to simultaneously output currents to the three phases of motor windings, and control the currents output to all the phases of motor windings to sequentially reach a preset current. The preset current is not limited in this embodiment of this application.

A principle and an idea on which the solutions of this application are based are first described below.

Figure 5:
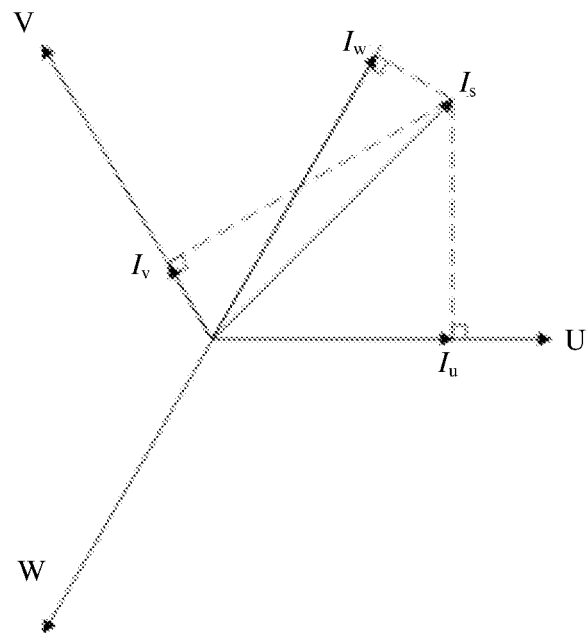
FIG. 5 is a schematic diagram of an example asymmetric three-phase current according to an embodiment of this application.

FIG. 5 is a schematic diagram of an example asymmetric three-phase current according to an embodiment of this application.

For a motor including three phases U, V, and W, a vector coordinate axis of a three-phase current of the motor is shown in the figure.

An integrated current vector represents a sum vector including current vectors on all coordinate axes in a three-phase coordinate system (or a dq-axis coordinate system). The integrated current vector shown in the figure is represented by Is.

When it is expected to heat a power battery pack by using heat generated by the motor windings, regardless of whether Is injected into the motor is a direct current or an alternating current, there is a problem that the motor windings generate heat unevenly. This is because regardless of how the integrated current vector Is is given, projections Iu, Iv, and Iw of Is on the three phases of coordinate axes are necessarily not equal. Therefore, a phase of winding with a relatively high current component has high heating power, and a temperature rises quickly, and quickly reaches a winding temperature limit. In addition, a phase of winding with a relatively low current component has relatively low heating power, and a temperature is still low.

However, in this case, heating power of the motor cannot be increased by further increasing a magnitude of the current, and the heating power of the motor encounters a bottleneck. Therefore, a heat generation capability of the motor windings cannot be fully used, and consequently there is an insufficient speed of heating the power battery pack, and relatively great impact is imposed on a service life of a phase of winding that generates heat for a long time. In this case, symmetry and reliability of the motor are severely affected.

The controller 102 in this embodiment of this application controls a working status of the inverter circuit 101, so that the inverter circuit 101 simultaneously outputs currents to the three phases of motor windings. In this case, the current flows through each of the three phases of motor windings, and the three phases of motor windings generate heat, and therefore heating power of the motor is increased. In addition, the controller further controls the currents input to all the phases of motor windings by the inverter circuit to sequentially reach the preset current. It may be understood that the preset current is a current value that can enable the motor winding to generate heat at relatively high power. In some embodiments, to maximize the heating power of the motor winding, the preset current is a maximum current value corresponding to the winding.

For example, a u-phase winding first reaches the preset current, and starts to generate heat at relatively high power. In this case, currents that flow through a v-phase winding and a w-phase winding are less than the preset current, and the v-phase winding and the w-phase winding generate heat at relatively small power. Then, the v-phase winding reaches the preset current. In this case, currents that flow through the u-phase winding and the w-phase winding are less than the preset current, the u-phase winding and the w-phase winding generate heat at relatively small power, the u-phase winding enters a buffer period, and a temperature no longer continues to rise. Then, the w-phase winding reaches the preset current. In this case, currents that flow through the u-phase winding and the v-phase winding are less than the preset current, the u-phase winding and the v-phase winding generate heat at relatively small power, the v-phase winding also enters a buffer period, and a temperature no longer continues to rise. This cycle repeats.

When there is a relatively short time length in which a current of each phase of motor winding is the preset current, in other words, the current that flows through each phase of motor winding is switched at a relatively high frequency, the three phases of windings of the motor may generate heat evenly, and the heating power may be maintained at a relatively high state, to fully use the heat generation capability of the motor windings.

In some embodiments, the controller 102 in the foregoing description may be an ASIC, a PLD, a DSP, or a combination thereof. The PLD may be a CPLD, an FPGA, GAL, or any combination thereof. This is not limited in this embodiment of this application.

The inverter circuit 101 includes a controllable switching transistor. A type of the controllable switch transistor is not limited in this embodiment of this application. For example, the controllable switching transistor may be an IGBT, a MOSFET, or a SiC MOSFET.

The controller 102 may send a control signal to the controllable switch transistor, to control a working status of the controllable switch transistor. In some embodiments, the control signal is a PWM signal.

In conclusion, according to the motor control unit provided in this embodiment of this application, all of the three phases of motor windings can generate heat, and therefore overall heating power of the motor is increased. In addition, the currents of the three phases of motor windings are controlled to sequentially be the preset current, so that the three phases of motor windings can generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved.

Description is provided below with reference to a specific control manner of the motor control unit.

Figure 6:
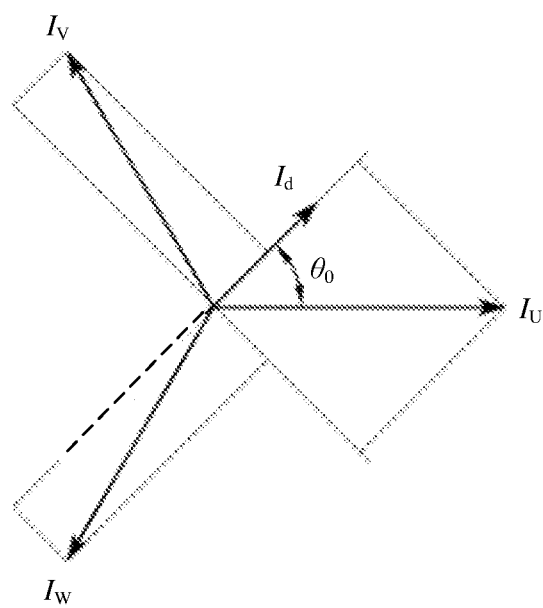
FIG. 6 is a schematic diagram of a three-phase current according to an embodiment of this application.

FIG. 6 is a schematic diagram of a three-phase current according to an embodiment of this application.

Herein, Id represents the preset current sequentially reached by all the phases of motor windings. The motor winding generates heat when the preset current passes through the motor winding. Therefore, within a permitted range of a motor winding parameter, a larger magnitude of the preset current indicates higher heating power of the motor winding and a higher speed of heating a power battery pack.

A manner of determining the preset current is first described below.

In a possible implementation, the controller determines the preset current based on a temperature of the power battery pack, and a magnitude of the preset current is negatively correlated with the temperature of the power battery pack.

For the power battery pack, within a same heating time, a lower temperature of the power battery pack indicates that more heat is required, in other words, a higher speed of heating the power battery pack is required, higher heating power of the motor winding is required, and a larger magnitude of the corresponding preset current is required.

Therefore, the controller may determine the preset current based on the temperature of the power battery pack. A lower temperature indicates that a larger magnitude of the preset current is required, to complete heating of the power battery pack within a same heating time. A correspondence between the temperature and the preset current may be predetermined, is stored in a form of a data table, and is invoked by the controller for use.

The controller may obtain temperature information of the power battery pack by using a VCU, to determine the temperature of the power battery pack. Alternatively, the controller may obtain temperature information of the power battery pack from a BMS, to determine the temperature of the power battery pack.

In another possible implementation, the controller determines the preset current based on an obtained heating instruction, and the heating instruction is used to indicate a magnitude of the preset current.

A driver may determine a heating power level (a higher heating power level indicates a higher heating speed) for the power battery pack based on a requirement, or adjust a heating time (a shorter heating time is equivalent to a higher heating power level) of the power battery pack. In response to an input operation performed by the diver, a VCU determines the corresponding heating instruction with reference to current temperature information of the power battery pack, and sends the heating instruction to the controller. The heating instruction is used to indicate the magnitude of the preset current.

The temperature information of the power battery pack is sent to the VCU by a BMS.

After obtaining the heating instruction, the controller determines the corresponding preset current. A correspondence between the heating instruction and the preset current may be predetermined, is stored in a form of a data table, and is invoked by the controller for use.

A process in which the controller adjusts the input currents of the three phases of motor windings is described below in detail.

The controller first obtains a current preset position angle. The preset position angle represents an angle between the preset current and a d axis of the motor.

In the figure, an example in which a direction of a U-phase current is the d-axis of the motor, and the angle $\theta_o$ between the preset current Id and the d axis of the motor is the preset position angle is used.

The controller determines an amplitude and a phase of the input current of each phase of motor winding based on the preset position angle $\theta_o$ and the preset current Id. Details are described below.

The controller controls the current output by the inverter circuit to each of the three phases of motor windings to be in a waveform, for example, a sine wave, a square wave, or a triangular wave, that can present alternating positive and negative transformation. Specific description is provided below by using the sine wave as an example. There is a similar principle when another type of waveform is used. Details are not described in this embodiment.

When t represents time, w represents a frequency of a signal, and iu(t), iv(t), and iw(t) respectively represent instantaneous directions of currents of three phases U, V, and W, there is the following relationship.

$$\begin{cases} i_u(t) = I_d\cos(\omega t)\cos(\theta_0) \\ i_v(t) = -\frac{1}{2}I_d\cos(\omega t)\cos(\theta_0) \\ i_w(t) = -\frac{1}{2}I_d\cos(\omega t)\cos(\theta_0) \end{cases} \quad (a)$$

In this embodiment of this application, the three phases of motor windings are controlled to simultaneously generate heat, to increase the heating power of the motor. The preset position angle $\theta_o$ is controlled to periodically change, so that Id overlaps the three phases U, V, and W in different time periods, to implement that the currents of the three phases of motor windings reach the preset current in different time periods. When a phase of motor winding generates heat at the preset current, the phase of motor winding has maximum heating power, and the other two phases of motor windings generate heat at relatively small heating power.

The controller controls the preset position angle $\theta_o$ to periodically change within a preset angle range. Details are described below.

In a possible implementation, the preset angle range is from 0° to 360°, the controller controls the preset position angle to periodically change based on a preset time interval and a preset angle increment, and a value of the preset angle increment is a positive divisor of 120.

The preset time interval is not limited in this embodiment of this application. The preset time interval is usually set to a relatively short time, for example, a time at a second level.

The positive divisor of 120 includes 1, 2, 3, 4, 5, 6, 8, 10, 12, 15, 20, 24, 30, 40, 60, and 120. Description is provided below by using an example. In the following description, Iu, Iv, and Iw are respectively amplitudes of the currents of the three phases U, V, and W. For instantaneous expressions respectively corresponding to the currents, refer to the formula (a). The expressions are not listed one by one.

(1) An implementation in which the preset angle increment is 120° is first described, and an example in which the preset time interval is 10 seconds (s for short) is used.

[0s, 10s], $\theta_o$=0°, in other words, Id is aligned with the phase U. In this case, Iu=Id, and Iv=Iw=Id/2.

(10s, 20s], $\theta_o$=120°, in other words, Id is aligned with the phase V. In this case, Iv=Id, and Iu=Iw=Id/2.

(20s, 30s], $\theta_o$=240°, in other words, Id is aligned with the phase W. In this case, Iw=Id, and Iu=Iv=Id/2.

The process is then repeated periodically until heating of the power battery pack is completed.

(2) An implementation in which the preset angle increment is 60° is described below, and an example in which the preset time interval is 10s is used again.

[0s, 10s], $\theta_o$=0°, in other words, Id is aligned with the phase U. In this case, Iu=Id, and Iv=Iw=Id/2.

(10s, 20s], $\theta_o$=60°, in other words, Id is aligned with a phase −W. In this case, Iw=Id, and Iu=Iv=Id/2.

(20s, 30s], $\theta_o$=120°, in other words, Id is aligned with the phase V. In this case, Iv=Id, and Iu=Iw=Id/2.

(30s, 40s], $\theta_o$=180°, in other words, Id is aligned with a phase −U. In this case, Iu=Id, and Iv=Iw=Id/2.

(40s, 50s], $\theta_o$=240°, in other words, Id is aligned with the phase W. In this case, Iw=Id, and Iv=Iu=Id/2.

(50s, 60s], $\theta_o$=300°, in other words, Id is aligned with a phase −V. In this case, Iv=Id, and Iu=Iw=Id/2.

The process is then repeated periodically until heating of the power battery pack is completed.

(3) Another implementation in which the preset angle increment is 120° is described below, and the preset time interval is still 10s. In this case, Id is not aligned with one phase of axis, but is always kept at a constant angle with respect to the one phase of axis. An example in which the constant angle is 30° is used. In this case, there are the following cases:

[0s, 10s], $\theta_o$=30°. In this case, Iu=Iw=0.866*Id, and Iv=0.
(10s, 20s], $\theta_o$=150°, In this case, Iv=Iu=0.866*Id, and Iw=0.
(20s, 30s], $\theta_o$=270°. In this case, Iw=Iv=0.866*Id, and Iu=0.

The process is then repeated periodically until heating of the power battery pack is completed.

(4) An implementation in which the preset angle increment is 60° is described below, and the preset time interval is still 10s. In this case, Id is not aligned with one phase of axis, but is always kept at a constant angle with respect to the one phase of axis. An example in which the constant angle is 30° is used. In this case, there are the following cases:

[0s, 10s], $\theta_o$=30°. In this case, Iu=Iw=0.866*Id, and Iv=0.
(10s, 20s], $\theta_o$=90°. In this case, Iv=Iw=0.866*Id, and Iu=0.
(20s, 30s], $\theta_o$=150°. In this case, Iu=Iv=0.866*Id, and Iw=0.
(30s, 40s], $\theta_o$=210°. In this case, Iu=Iw=0.866*Id, and Iv=0.
(40s, 50s], $\theta_o$=270°. In this case, Iv=Iw=0.866*Id, and Iu=0.
(50s, 60s], $\theta_o$=330°. In this case, Iu=Iv=0.866*Id, and Iw=0.

The process is then repeated periodically until heating of the power battery pack is completed.

In another possible implementation, the preset angle range is from 0° to 120°, the controller controls the preset position angle to periodically change based on a preset time interval and a preset angle increment, and a value of the preset angle increment is a positive divisor of 60.

The positive divisor of 60 includes 1, 2, 3, 4, 5, 6, 10, 12, 15, 20, 30, and 60.

Description is provided below by using an example. In the following description, Iu, Iv, and Iw are respectively amplitudes of the currents of the three phases U, V, and W. For instantaneous expressions respectively corresponding to the currents, refer to the formula (a). The expressions are not listed one by one.

(1) An implementation in which the preset angle increment is 60° is first described, and an example in which the preset time interval is 10s is used.

[0s, 10s], $\theta_o$=0°, in other words, Id is aligned with the phase U. In this case, Iu=Id, and Iv=Iw=Id/2.
(10s, 20s], $\theta_o$=60°, in other words, Id is aligned with the phase W. In this case, Iw=Id, and Iu=Iv=Id/2.
(20s, 30s], $\theta_o$=120°, in other words, Id is aligned with the phase V. In this case, Iv=Id, and Iu=Iw=Id/2.

The process is then repeated periodically until heating of the power battery pack is completed.

(2) An implementation in which the preset angle increment is 60° is described below, and the preset time interval is still 10s. In this case, Id is not aligned with one phase of axis, but is always kept at a constant angle with respect to the one phase of axis. An example in which the constant angle is 300 is used. In this case, there are the following cases:

[0s, 10s], $\theta_o$=30°. In this case, Iu=Iw=0.866*Id, and Iv=0.
(10s, 20s], $\theta_o$=90°. In this case, Iv=Iw=0.866*Id, and Iu=0.
(20s, 30s], $\theta_o$=150°. In this case, Iu=Iv=0.866*Id, and Iw=0.

The process is then repeated periodically until heating of the power battery pack is completed.

After determining the amplitude and the phase of the input current of each phase of motor winding based on the preset position angle and the preset current, the controller determines an amplitude and a phase of an input voltage of each phase of motor winding based on the amplitude and the phase of the input current of each phase of motor winding and impedance of each phase of motor winding.

The voltage is equal to a product of the current and the impedance.

The impedance of the motor winding is an inherent parameter of the motor winding, may be predetermined and stored, and is invoked by the controller for use.

The controller then determines a duty cycle of a control signal of the inverter circuit based on the amplitude of the input voltage, and determines a sending time of the control signal of the inverter circuit based on the phase of the input voltage, to control the working status of the inverter circuit by using the control signal.

When the motor control unit is applied to an electric vehicle, to transfer heat generated by the motor winding to the power battery pack, a cooling loop on the electric vehicle may be directly reused. Specific description is provided below.

Figure 2:
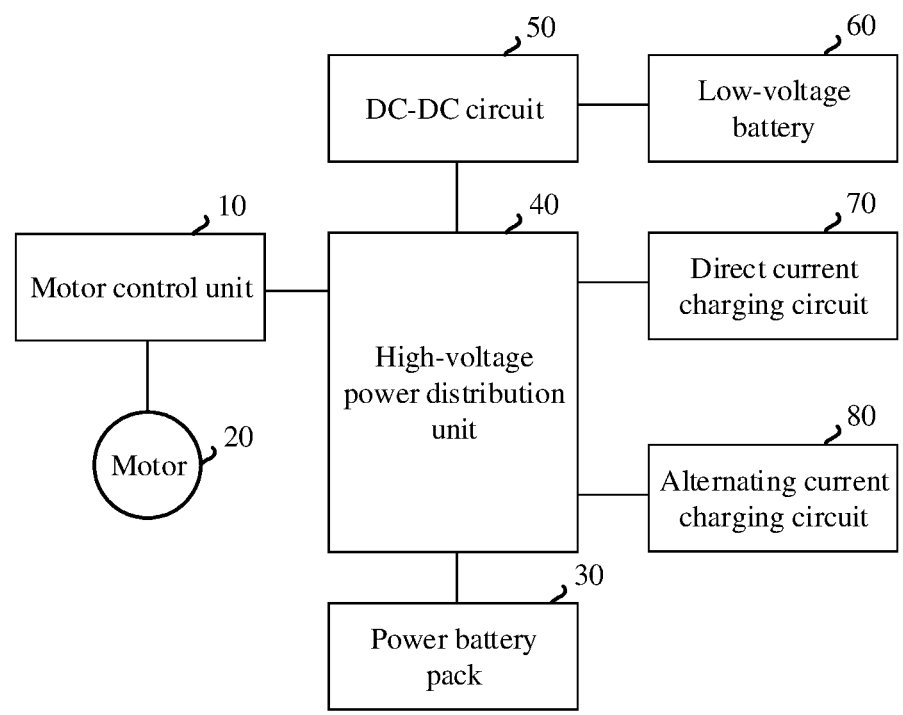
FIG. 2 is a schematic diagram of an electrical system of an example electric vehicle according to an embodiment of this application.

The cooling loop on the electric vehicle includes a first cooling loop and a second cooling loop. The first cooling loop is configured to perform heat exchange for the motor. For a manner of cooling the motor by the loop, refer to the description corresponding to FIG. 2. A cooling medium in the first cooling loop absorbs heat generated by the motor winding, and transfers the heat to a cooling medium in the second cooling loop by using a heat exchanger. The second cooling loop is configured to: perform heat exchange between the motor control unit and the power battery pack, and transfer heat obtained from the motor control unit and heat obtained from the heat exchanger to the power battery pack, to heat the power battery pack.

A heat cycle of the cooling medium in the first cooling loop is driven by a pump apparatus. In some embodiments, the controller is further configured to control a working status of the pump apparatus, for example, may control output power, a startup time, and a shutdown time of the pump apparatus. It may be understood that the pump apparatus may also be controlled by another controller such as a vehicle control unit. In some implementations, when the power battery pack is heated, the controller controls the pump apparatus to startup, to drive the cooling medium to circulate in the first cooling loop.

The inverter circuit in the foregoing embodiment may be a three-phase two-level inverter circuit or a three-phase three-level inverter circuit. This is not limited in this embodiment of this application. A specific working principle and an implementation of the inverter circuit are relatively mature technologies. Details are not described herein in this embodiment.

In conclusion, according to the motor control unit provided in this embodiment of this application, the three phases of motor windings of the motor can be controlled to simultaneously generate heat, and therefore the overall heating power of the motor is increased. In addition, an output current of the inverter circuit is further controlled, so that the currents of all the phases of motor windings sequentially reach the preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. In addition, a case in which an additional heating apparatus is added to heat the power battery pack is avoided, and therefore hardware costs are reduced.

Based on the motor control unit provided in the foregoing embodiment, an embodiment of this application further provides a control method for a motor control unit. Specific description is provided below with reference to the accompany drawings.

Figure 7:
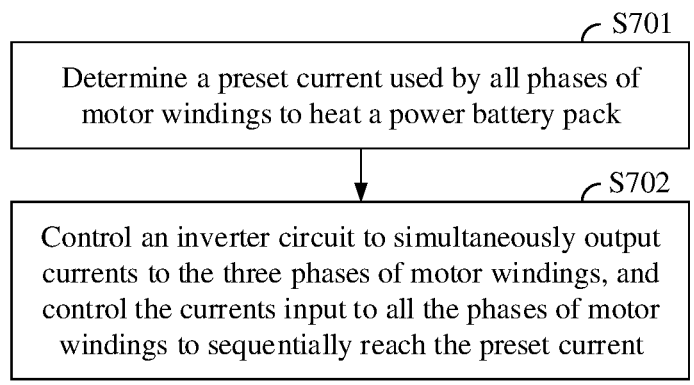
FIG. 7 is a schematic diagram of a control method for a motor control unit according to an embodiment of this application.

FIG. 7 is a schematic diagram of a control method for a motor control unit according to an embodiment of this application.

The method includes the following steps.

S701: Determine a preset current used by all phases of motor windings to heat a power battery pack.

In a possible implementation, the preset current is determined based on a temperature of the power battery pack, and a magnitude of the preset current is negatively correlated with the temperature of the power battery pack.

For the power battery pack, within a same heating time, a lower temperature of the power battery pack indicates that more heat is required, in other words, a higher speed of heating the power battery pack is required, higher heating power of the motor winding is required, and a larger magnitude of the corresponding preset current is required.

Therefore, the preset current may be determined based on the temperature of the power battery pack. A lower temperature indicates that a larger magnitude of the preset current is required, to complete heating of the power battery pack within a same heating time.

Temperature information of the power battery pack may be obtained by using a VCU, to determine the temperature of the power battery pack. Alternatively, temperature information of the power battery pack may be obtained from a BMS, to determine the temperature of the power battery pack.

In another possible implementation, the preset current is determined based on an obtained heating instruction, and the heating instruction is used to indicate a magnitude of the preset current.

A driver may determine a heating power level (a higher heating power level indicates a higher heating speed) for the power battery pack based on a requirement, or adjust a heating time (a shorter heating time is equivalent to a higher heating power level) of the power battery pack. In response to an input operation performed by the diver, the heating instruction is generated. The heating instruction is used to indicate the magnitude of the preset current.

S702: Control an inverter circuit to simultaneously output currents to the three phases of motor windings, and control the currents input to all the phases of motor windings to sequentially reach the preset current.

In some embodiments, S702 includes the following process:

S702a: Determine an amplitude and a phase of the input current of each phase of motor winding based on a preset position angle and the preset current, where the preset position angle represents an angle between the preset current and a d axis of a motor.

In this case, in this method, to implement that the three phases of motor windings generate heat evenly, the preset position angle needs to be controlled to periodically change within a preset angle range.

A manner of adjusting the preset position angle is first described below.

In a possible implementation, the preset angle range is from 0° to 360°, a controller controls the preset position angle to periodically change based on a preset time interval and a preset angle increment, and a value of the preset angle increment is a positive divisor of 120.

The preset time interval is not limited in this embodiment of this application. The preset time interval is usually set to a relatively short time, for example, a time at a second level.

The positive divisor of 120 includes 1, 2, 3, 4, 5, 6, 8, 10, 12, 15, 20, 24, 30, 40, 60, and 120.

In another possible implementation, the preset angle range is from 0° to 120°, the controller controls the preset position angle to periodically change based on a preset time interval and a preset angle increment, and a value of the preset angle increment is a positive divisor of 60.

The positive divisor of 60 includes 1, 2, 3, 4, 5, 6, 10, 12, 15, 20, 30, and 60.

S702b: Determine an amplitude and a phase of an input voltage of each phase of motor winding based on the amplitude and the phase of the input current of each phase of motor winding and impedance of each phase of motor winding.

The voltage is equal to a product of the current and the impedance. The impedance of the motor winding is an inherent parameter of the motor winding, and may be predetermined.

S702c: Determine a duty cycle of a control signal of the inverter circuit based on the amplitude of the input voltage, and determine a sending time of the control signal of the inverter circuit based on the phase of the input voltage.

A working status of the inverter circuit is controlled by using the control signal, to generate a corresponding three-phase current.

In conclusion, according to the control method for a motor control unit provided in this embodiment of this application, all of the three phases of motor windings can be controlled to generate heat, and therefore overall heating power of the motor is increased. In addition, an output current of the inverter circuit is controlled, so that the currents of all the phases of motor windings sequentially reach the preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. In addition, no additional heating apparatus is needed, and occupied space and costs can be reduced.

Based on the motor control unit provided in the foregoing embodiment, an embodiment of this application further provides a power train. Specific description is provided below with reference to the accompany drawings.

Figure 8:
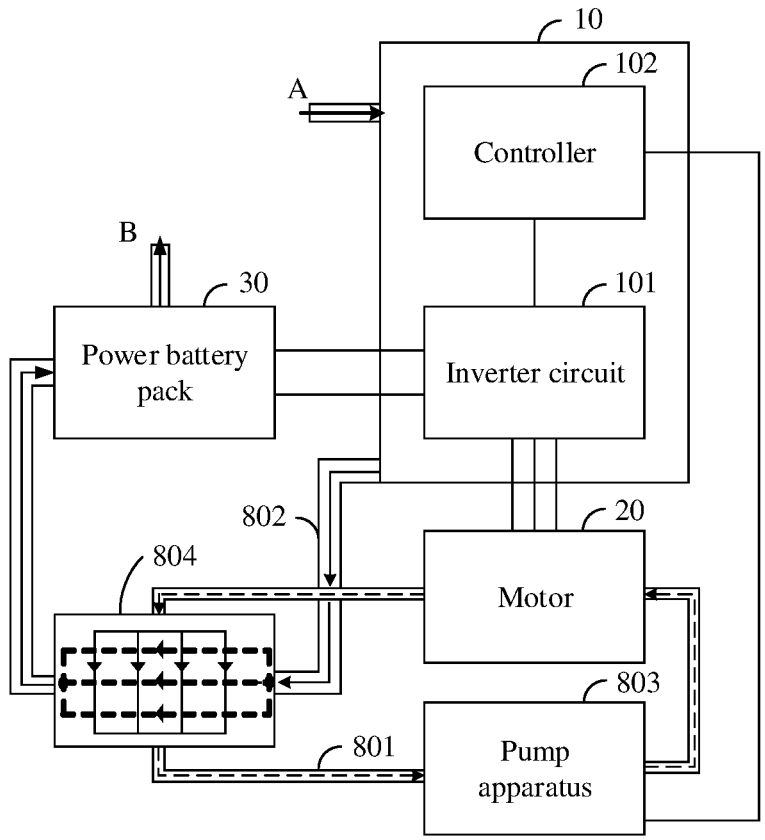
FIG. 8 is a schematic diagram of a power train according to an embodiment of this application.

FIG. 8 is a schematic diagram of a power train according to an embodiment of this application.

The power train shown in the figure includes a motor control unit 10, a motor 20, a first cooling loop 801, a second cooling loop 802, a pump apparatus 803, and a heat exchanger 804.

The first cooling loop 801 is configured to perform heat exchange for the motor 20.

The pump apparatus 803 is configured to drive a cooling medium in the first cooling loop 801 to circulate. In some embodiments, the cooling medium in the first cooling loop is coolant oil, and a type of the coolant oil is not limited in this application.

The second cooling loop 802 is configured to perform heat exchange between the motor control unit 10 and a power battery pack 30. In some embodiments, a cooling medium in the second cooling loop 802 is cooling water.

The heat exchanger 804 is configured to implement heat exchange between the cooling medium in the first cooling loop and the cooling medium in the second cooling loop.

A process of heating power train the power battery pack by the power train is described below in detail.

Circulation of the cooling medium in the first cooling loop 801 is shown by a dashed line arrow in FIG. 8. Heat exchange is performed for the motor, so that the cooling medium in the first cooling loop 801 absorbs heat generated by a motor winding. For a principle and a process of generating heat by the motor winding, refer to related description in the foregoing embodiments. Details are not described herein in this embodiment of this application. The cooling medium in the first cooling loop 801 then transfers the heat to the cooling medium in the second cooling loop 802 by using the heat exchanger 804.

The cooling medium in the second cooling loop 802 flows in from a point A, first absorbs heat from the motor control unit 10, then absorbs, when passing through the heat exchanger 804, the heat transferred by the cooling medium in the first cooling loop 801, to fully increase a temperature, and then passes through the power battery pack 30, to fully heat the power battery pack 30. After heating the power battery pack 30, the cooling medium reaches a point B. In some embodiments, the point A and the point B may connect to a heat dissipator, a heat dissipation system, another heat exchanger, or the like of the electric vehicle, to form a loop. This is not limited in this embodiment of this application.

In conclusion, the motor control unit provided in the foregoing embodiment is applied to the power train provided in this embodiment of this application, and a controller of the motor control unit controls an inverter circuit to simultaneously output currents to three phases of motor windings. In this case, all of the three phases of motor windings generate heat, and therefore overall heating power of the motor is increased. In addition, the controller controls an output current of the inverter circuit, so that the currents of all the phases of motor windings sequentially reach a preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. The first cooling loop and the second cooling loop of the power train fully absorb the heat generated by the motor control unit and the motor winding, to heat the power battery pack, and therefore the speed of heating the power battery pack is further increased. In addition, a case in which an additional heating apparatus is added to heat the power battery pack is avoided, and therefore costs of the power train are reduced, and implementation of a case in which a miniaturized and highly integrated power train is designed is facilitated.

Based on the motor control unit and the power train provided in the foregoing embodiments, an embodiment of this application further provides an electric vehicle. Description is provided below with reference to the accompany drawings.

Figure 9:
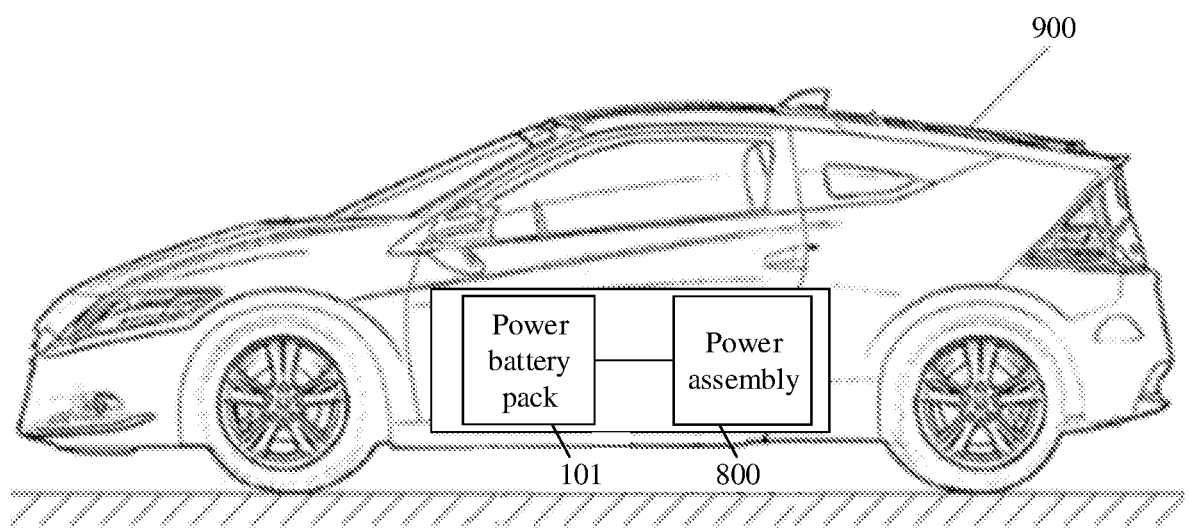
FIG. 9 is a schematic diagram of an electric vehicle according to an embodiment of this application.

FIG. 9 is a schematic diagram of an electric vehicle according to an embodiment of this application.

An electric vehicle 900 shown in the figure includes a power train 800 and a power battery pack 101.

The power train 800 includes a motor control unit, a motor, a first cooling loop, a second cooling loop, a pump apparatus, and a heat exchanger. For specific working principles of the power train 800 and the motor control unit, refer to related description in the foregoing embodiments. Details are not described herein in this embodiment.

The power battery pack 101 is configured to provide a direct current for the power train 800.

When the electric vehicle is started in a low temperature environment, under the action of the motor control unit, power train the direct current provided by the power battery pack 101 for the power train 800 enables three phases of motor windings of the motor to sufficiently generate heat, and in this case, a power switching device of the motor control unit also generates corresponding heat. The power train 800 transfers the heat generated by the three phases of motor windings and the heat generated by the motor control unit to the power battery pack 101 by using the cooling loop, to heat the power battery pack 101.

In conclusion, the motor control unit provided in the foregoing embodiment is applied to the electric vehicle, and a controller of the motor control unit controls an inverter circuit to simultaneously output currents to the three phases of motor windings. In this case, all of the three phases of motor windings generate heat, and therefore overall heating power of the motor is increased. In addition, the controller controls an output current of the inverter circuit, so that the currents of all the phases of motor windings sequentially reach a preset current. When the currents of the motor windings are the preset current, the motor windings have relatively high heating power, and therefore the three phases of motor windings generate heat evenly. In addition, with switching of a magnitude of a flowing current, the heating power of each of the three phases of motor windings may be maintained at a relatively high state. In this way, a heat generation capability of the motor windings is fully used, a speed of heating the power battery pack is increased, and a case in which a service life of a phase of motor winding is significantly shortened because the motor winding generates heat for a long time is avoided, and therefore symmetry and reliability of the motor are further improved. The first cooling loop and the second cooling loop of the power train of the electric vehicle fully absorb the heat generated by the motor control unit and the motor winding, to heat the power battery pack, and therefore the speed of heating the power battery pack is further increased.

In addition, a case in which an additional heating apparatus is added to heat the power battery pack is avoided, and therefore costs of the electric vehicle are reduced.

It should be understood that, in this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate: a, b, c, "a and b", "a and c", "b and c", or "a, b, and c", where a, b, and c may be singular or plural.

The foregoing embodiments are merely intended to describe the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A motor control unit, wherein an input end of the motor control unit is configured to connect to a power battery pack, an output end of the motor control unit is configured to connect to a motor winding of a three phase motor, and the motor control unit comprises:
    an inverter circuit, wherein an input end of the inverter circuit is the input end of the motor control unit, and each phase of an output end of the inverter circuit connects to a respective phase of the motor winding of the three phase motor; and
    a controller that is configured to:
    determine an amplitude and a phase of an input current of each phase of the motor winding based on a preset position angle and a preset current, wherein the preset position angle represents an angle between the preset current and a direct (d) axis of the three phase motor,
    control the inverter circuit to simultaneously output currents to the motor winding, and
    control the currents input to all phases of the motor winding to sequentially reach the preset current.

2. The motor control unit according to claim 1, wherein the controller is further configured to:
    determine the preset current based on a temperature of the power battery pack, wherein a magnitude of the preset current is negatively correlated with the temperature of the power battery pack.

3. The motor control unit according to claim 1, wherein the controller is further configured to:
    determine the preset current based on an obtained heating instruction, wherein the heating instruction is used to indicate a magnitude of the preset current.

4. The motor control unit according to claim 1, wherein the controller is further configured to:
    determine an amplitude and a phase of an input voltage of each phase of the motor winding based on the amplitude and the phase of the input current of each phase of the motor winding and impedance of each phase of the motor winding; and
    determine a duty cycle of a control signal of the inverter circuit based on the amplitude of the input voltage; and
    determine a sending time of the control signal of the inverter circuit based on the phase of the input voltage.

5. The motor control unit according to claim 4, wherein the controller is further configured to:
    control the preset position angle to periodically change within a preset angle range.

6. The motor control unit according to claim 5, wherein the preset angle range is from 0° to 360°, and the controller is further configured to:
    control the preset position angle to periodically change based on a preset time interval and a preset angle increment, and a value of the preset angle increment is a positive divisor of 120.

7. The motor control unit according to claim 5, wherein the preset angle range is from 0° to 120°, the controller is further configured to:
    control the preset position angle to periodically change based on a preset time interval and a preset angle increment, and a value of the preset angle increment is a positive divisor of 60.

8. The motor control unit according to claim 1, wherein the controller is further configured to:
    control the current output by the inverter circuit to each phase of the motor windings to be in one of the following waveforms:
    a sine wave, a square wave, or a triangular wave.

9. The motor control unit according to claim 1, wherein the inverter circuit is a three-phase two-level inverter circuit or a three-phase three-level inverter circuit.

10. The motor control unit according to claim 1, wherein the controller is further configured to:
    control a working status of a pump apparatus, and the three phase motor is configured to:
    perform heat exchange by a first cooling loop, and
    drive, by using the pump apparatus, a cooling medium to circulate in the first cooling loop.

11. A power train comprising the motor control unit according to claim 10, and further comprising:
    the three phase motor,
    a first cooling loop configured to perform heat exchange for the three phase motor;
    a second cooling loop configured to perform heat exchange between the motor control unit and a power battery pack;
    a pump apparatus configured to drive a cooling medium in the first cooling loop to circulate; and
    a heat exchanger configured to implement heat exchange between the cooling medium in the first cooling loop and a cooling medium in the second cooling loop.

12. A control method for a motor control unit comprising an inverter circuit and a controller, wherein an input end of the inverter circuit is an input end of the motor control unit, and is configured to connect to a power battery pack, each phase of output end of the inverter circuit connects to each phase of a motor winding of a three phase motor, and the control method comprises:
    determining a preset current used by all phases of the motor winding to heat the power battery pack;
    determining an amplitude and a phase of an input current of each phase of the motor winding based on a preset position angle and the preset current, wherein the preset position angle represents an angle between the preset current and a direct (d) axis of the three phase motor; and
    controlling the inverter circuit to simultaneously output currents to the three phases of the motor winding; and controlling the currents input to all phases of the motor winding to sequentially reach the preset current.

13. The control method according to claim 12, wherein determining the preset current used by all phases of the motor winding to heat the power battery pack further comprises:
   determining the preset current based on a temperature of the power battery pack, wherein a magnitude of the preset current is negatively correlated with the temperature of the power battery pack.

14. The control method according to claim 12, wherein determining the preset current used by all phases of the motor winding to heat the power battery pack further comprises:
   determining the preset current based on an obtained heating instruction, wherein the heating instruction is used to indicate a magnitude of the preset current.

15. The control method according to claim 12, wherein controlling the inverter circuit to simultaneously output currents to the three phases of the motor winding and controlling the currents input to all phases of the motor winding to sequentially reach the preset current further comprises:
   determining an amplitude and a phase of an input voltage of each phase of the motor winding based on the amplitude and the phase of the input current of each phase of the motor winding and impedance of each phase of the motor winding; and
   determining a duty cycle of a control signal of the inverter circuit based on the amplitude of the input voltage; and
   determining a sending time of the control signal of the inverter circuit based on the phase of the input voltage.

16. The control method according to claim 15, wherein controlling the currents input to all phases of the motor winding to sequentially reach the preset current further comprises:
   controlling the preset position angle to periodically change within a preset angle range.

17. The control method according to claim 16, wherein the preset angle range is from 0° to 360°, and controlling the preset position angle to periodically change within the preset angle range further comprises:
   controlling the preset position angle to periodically change based on a preset time interval and a preset angle increment, wherein a value of the preset angle increment is a divisor of 120.

18. The control method according to claim 16, wherein the preset angle range is from 0° to 120°, and controlling the preset position angle to periodically change within the preset angle range further comprises:
   controlling the preset position angle to periodically change based on a preset time interval and a preset angle increment, wherein a value of the preset angle increment is a divisor of 60.

* * * * *